March 18, 1969  R. F. KOWALIK  3,433,904
SEMICONDUCTOR TRANSDUCER

Filed May 6, 1966

INVENTOR.
RONALD F. KOWALIK
BY
ATTY.

United States Patent Office 3,433,904
Patented Mar. 18, 1969

3,433,904
SEMICONDUCTOR TRANSDUCER
Ronald F. Kowalik, Lombard, Ill., assignor to Automatic Electric Laboratories, Inc., Northlake, Ill., a corporation of Delaware
Filed May 6, 1966, Ser. No. 548,111
U.S. Cl. 179—110                                    10 Claims
Int. Cl. H04r 21/02, 17/04; H01l 15/00

This invention relates generally to semiconductor transducers and particularly to a telephone transmitter employing a semiconductor transducer and a telephone subset circuit incorporating a transmitter of this type.

The operation of a semiconductor transducer is based on the electrical effects produced by stressing the junction between two regions of semiconductor material of opposite conductivity type, i.e., a p-n junction. These effects have been known for some time and have been discussed quite extensively in the literature; see, e.g., the paper by W. Ridner and I. Braun, "Resistance of Elastically Deformed Shallow P-N Junctions, II," Journal of Applied Physics, vol. 34, pp. 1958–70 (July 1963). In addition, U.S. Patent 2,632,062 issued to H. C. Montgomery on Mar. 17, 1953, discloses a semiconductor transducer in which these effects are employed.

Typically, in the past, a sharply-pointed stylus has been used to apply pressure to the surface of the semiconductor element. In order to accomplish this application of pressure in an effective manner, the tip of the stylus must usually be positioned very accurately on the surface. Once positioned, the stylus is usually forced against the surface to place a bias stress on the p-n junction so that the transducer operates in a sensitive region of the operating characteristic. The position of the stylus and the bias stress are then maintained by securing the stylus rigidly against the surface of the semiconductor element. However, with the stylus and semiconductor element thus secured together, the transducer is a fragile device since the semiconductor element is subject to fatal damage from shock or vibration experienced by the transducer during manufacture, shipping and handling, and actual use. Moreover, a transducer assembled in this fashion is subject to changes in the magnitude of the bias stress produced by variations in temperature which affect the stylus; and these changes may greatly reduce the operating efficiency of the transducer. With a rigid assembly there is no provision for adjustment of this bias stress.

The copending application of T. F. Longwell, "Semiconductor Transducer Assembly," U.S. Ser. No. 481,752, filed Aug. 23, 1965, and assigned to the assignee of the present application, discloses a technique which solves the problems involved in accurately positioning the tip of the stylus on the surface of the semiconductor element. The disclosure of the above-referenced copending application is incorporated by reference in this application as fully as if it were completely set forth herein.

In the technique disclosed in the above-referenced copending application, however, the position of the stylus and the bias stress on the p-n junction are maintained by securing the stylus against the surface of the semiconductor element, so it also results in a transducer which is subject to the above-mentioned limitations.

Therefore, it is the primary object of this invention to provide an improved semiconductor transducer.

It is a further object of this invention to provide an improved operating circuit for a microphone or transmitter employing a semiconductor transducer.

It is another object of this invention to provide a telephone substation circuit employing a semiconductor transmitter.

This invention features a semiconductor transducer in which the semiconductor element and the actuating element are maintained normally in a spaced-apart relation with one of the above elements mounted on a support means which responds to an applied control to bring the semiconductor element and the actuating element into contact with each other. The support means, preferably formed of piezoelectric material, is also used to apply a variable biasing stress on the p-n junction in the semiconductor element.

Another feature of this invention is an operating circuit for a microphone employing a semiconductor transducer and including switch contacts to disconnect the piezoelectric supporting element in the microphone from an energizing source of DC voltage when the microphone is not in use and a proximity circuit which is sensitive to the nearness of the human body and controls the supply of DC voltage to the piezoelectric element. Thus, when the microphone is turned off at the switch contacts, the stylus is separated from the semiconductor element so that the element is less likely to be damaged by any shock experienced by the microphone. Furthermore, the proximity circuit will protect the transducer in the event the microphone is dropped by turning off the supply of DC voltage to the piezoelectric element when contact with the human body is broken.

Other objects and features and a complete understanding of this invention will be gained from a consideration of the following description in conjunction with the accompanying drawings, in which.

Figure 1:
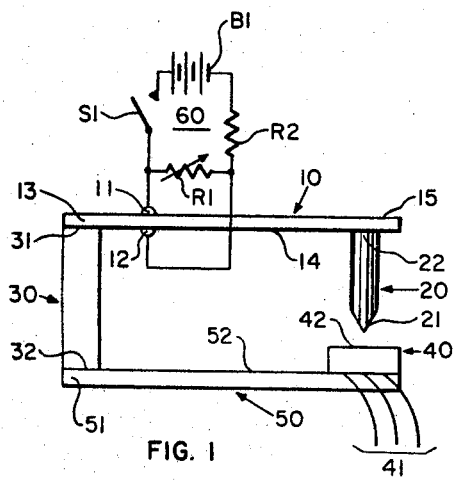
FIG. 1 is an elevation view of a semiconductor transducer according to the invention.

In FIG. 1 a semiconductor transducer in accordance with this invention is shown. The transducer comprises a semiconductor element 40, shown here as a transistor; an actuating element 20 which is a sharply-pointed stylus; and a basic support structure composed of a rigid member 30, a piezoelectric element 10, and a flexible member 50. The piezoelectric element 10 is mounted in a cantilever manner with its end 13 fastened on the top 31 of the rigid member 30. The flexible member 50 is also mounted in a cantilever manner with its end 51 fastened on the bottom 32 of the rigid member 30. The stylus 20 is supported by the piezoelectric element 10 with its top 22 mounted on the bottom surface 14 of the piezoelectric element 10. The transistor 40 is supported by the flexible member 50, being mounted on the top 52 of the flexible member.

As shown in FIG. 1, the stylus 20 and the transistor 40 are supported by the basic support structure so that normally the tip 21 of the stylus 20 is separated from the top 42 of the transistor 40. This normal condition is defined as the condition of the transducer when the DC voltage across the electrodes 11 and 12 on the top 15 and bottom 14, respectively, of the piezoelectric element is zero. This is the condition depicted in FIG. 1 with the switch S1 in the bias circuit 60 open.

Figure 2:
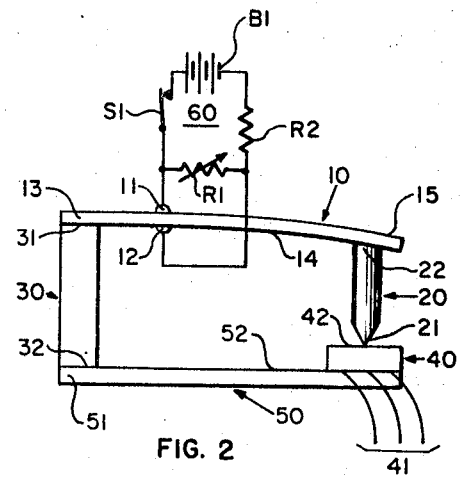
FIG. 2 is an elevation view of the semiconductor transducer of FIG. 1 is an operated condition.

In FIG. 2 the semiconductor transducer of FIG. 1 is shown in an operated condition. Here the switch S1 is closed so that a DC voltage is established across variable resistance R1 by the current from battery B1. Resistances R1 and R2 form a voltage divider so that the voltage across resistance R1 can be controlled by varying its resistance. Since resistance R1 is in parallel with the electrodes 11 and 12 of the piezoelectric element 10, the same voltage is developed across these electrodes as exists across resistance R1. With the D.C. voltage established across the electrodes 11 and 12, an electric field is set up in the piezoelectric element, and the piezoelectric element bends. At a certain magnitude of voltage across resistance R1 the piezoelectric element will bend just far enough to cause the tip 21 of the stylus 20 to contact the top surface 42 of the transistor 40. If resistance R1 is increased, the voltage across it will increase, and the piezoelectric element 10 will tend to bend further and will begin to force the stylus 20 against the surface 42 of the transistor 40. This force exerted between the transistor 40 and the stylus 20 places a bias stress on the p-n junction (base-emitter junction) in the transistor. The magnitude of this bias stress can be controlled by varying the resistance R1 to place the transducer in a sensitive region of its operating characteristic.

From the above description it can be seen that by mounting the stylus 20 on the piezoelectric element 10, the tip 21 of the stylus 20 can be kept normally spaced-apart from the surface 42 of the transistor. This is advantageous since the stylus 20 is then less likely to cause damage to the transistor 40 if the transducer experiences a shock due to being dropped or handled roughly. The piezoelectric element 10 provides the facility to bring the stylus 20 and transistor 40 together and to apply a bias force between them. The magnitude of this bias force can be controlled by varying the magnitude of the voltage across the piezoelectric element, so that the proper adjustment can be made on an individual basis for each transducer.

Figure 3:
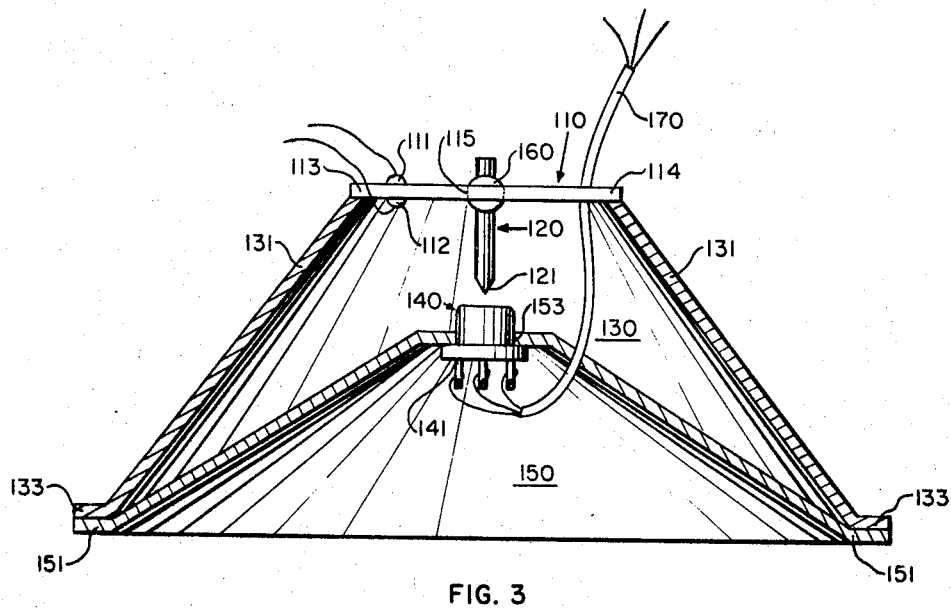
FIG. 3 is a sectioned elevation view of a telephone transmitter or microphone employing a smeiconductor transducer according to the invention.

In FIG. 3 the semiconductor transducer in accordance with this invention is shown embodiment in telephone transmitter or microphone. In this embodiment the piezoelectric element 110 is mounted on the rim 131 of a hollow case 130. This mounting is of the suspension type since the element 110 is supported on both of its ends 113 and 114. The stylus 120 is mounted in a hole 115 in the piezoelectric element 110. The positioning of the stylus 120 and filling of the hole 115 with the epoxy material 160 is accomplished in the manner described in the above-referenced copending application of Longwell.

The transmitter shown has the diaphragm 150 mounted on the case 130 with its rim 151 fastened on the rim 133 of the case. The transistor header 140 is mounted in the hole 153 in the diaphragm. The transmitter is constructed in the same manner as the transmitter in the copending Longwell application except that the stylus 120 is mounted in a hole in the piezoelectric element 110 and the tip 121 of the stylus is normally separated or spaced-apart from the surface of the transistor which is mounted in the transistor header 140.

The operation of this transmitter is similar to the operation of the transducer of FIG. 1. The proper DC voltage across electrodes 111 and 112 will cause piezoelectric element 110 to bend inward until the stylus 120 contacts the transistor (not shown) inside the header 140 and places a bias stress on the base-emitter junction thereof. The sound pressure against the diaphragm 150 will then modulate the stress on the base-emitter junction. If the transistor is connected in a biasing circuit, such as the one shown in FIG. 5, the output of the transistor will vary with the variation in stress on the emitter-base junction.

Figure 4:
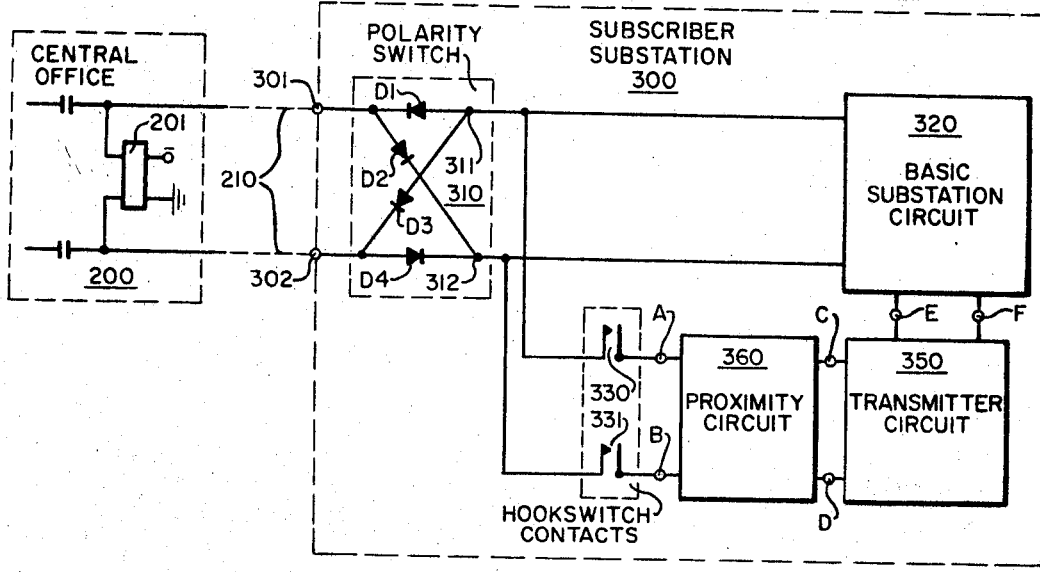
FIG. 4 is a block schematic diagram of a telephone substation circuit in which the transmitter of FIG. 3 can be utilized.

In FIG. 4 a block diagram of a telephone substation circuit which incorporates the transmitter of FIG. 3 is shown. The central office 200 supplies a DC voltage through relay 201 over the telephone lines 210 to the terminals 301 and 302 of the subscriber substation 300.

The substation 300 contains, in addition to the basic substation circuit 320, a polarity switch 310, a transmitter circuit 350, a proximity circuit 360 and extra hookswitch contacts 330 and 331. The polarity switch 310 is comprised of diodes D1, D2, D3 and D4; its function is to maintain the polarity at the terminals 311 and 312 the same regardless of the manner in which the terminals 301 and 302 are connected to the line 210.

The hookswitch contacts 330 and 331 are used to cut off the DC voltage to the proximity circuit 360 when the handset is on hook. The proximity circuit 360 is the type which is sensitive to the nearness of the human body, and controls the supply of DC voltage to the transmitter circuit 350. The proximity circuit 360 thus protects the transducer in the transmitter by cutting off the supply of DC voltage to the transmitter circuit 350 if the handset is dropped. Of course, the transducer is also protected when the subset is disconnected from the line 210 since no DC voltage is supplied to the piezoelectric element.

Figure 5:
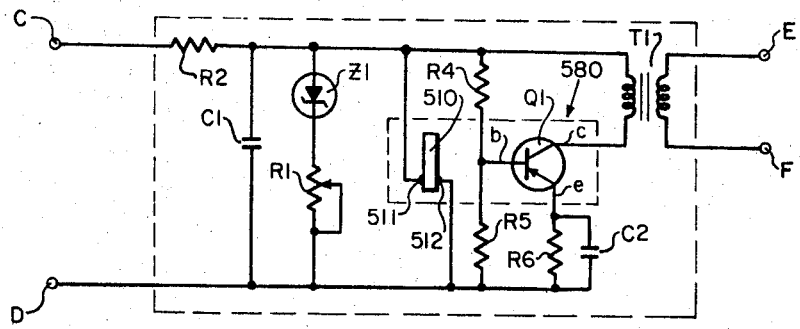
FIG. 5 is an electrical schematic diagram of one embodiment of the transmitter circuit shown in FIG. 4.

In FIG. 5 an embodiment of the transmitter circuit 350 in FIG. 4 is shown. The piezoelectric element 510 and transistor Q1 are the electrical components of the transducer in the transmitter. The resistance R2, Zener diode Z1 and potentiometer R3 form a voltage divider network which controls the DC voltage applied across electrodes 511 and 512 of the piezoelectric element 510. Resistors R4, R5, and R6 comprise the biasing circuit for the transistor Q1 which is, for purposes of illustration only, connected in a common emitter configuration. The output of the transistor is taken from the collector C and is coupled through impedance matching transformer T1 to the terminals E and F.

Figure 6:
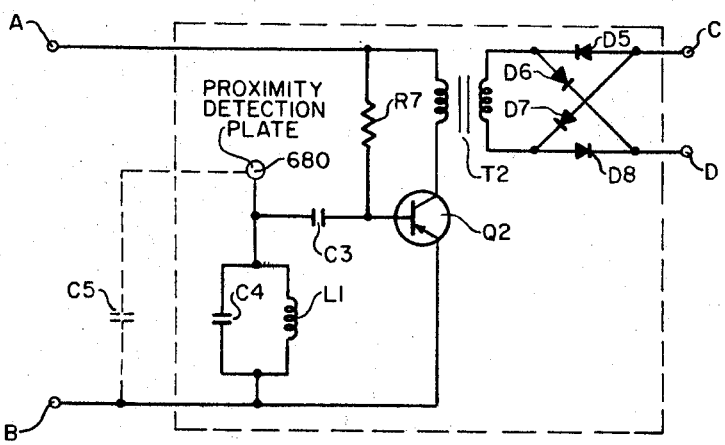
FIG. 6 is an electrical schematic diagram of one embodiment of the proximity circuit shown in FIG. 4.

FIG. 6 illustrates one possible embodiment of the proximity circuit 360 in FIG. 4. This proximity circuit is of the oscillator type and is discussed in the article by R. J. Levine, "Try Capacitance Transducers," Electronic Design, Mar. 15, 1966. Transistor Q2, resistor R7, and the tuned circuit C3, C4, L1 comprise an oscillator which remains off until the capacity of the human body C5 completes a circuit from the proximity detection plate 680 to the reference potential at terminal B, which, in this case, is ground. When the circuit oscillates due to the nearness of the human body, the output signal is coupled through transformer T2 and is rectified by the full-wave rectifier, composed of diodes D5, D6, D7 and D8, to provide a DC voltage across terminals C and D. This DC voltage can be made larger or smaller than the voltage available at terminals A and B by using a step-up or step-down transformer as transformer T2. This is particularly advantageous if the voltage requirements of the piezoelectric element 510 in FIG. 5 are such that the magnitude of the voltage from the central office battery is not sufficient.

While the above description has been made with reference to specific embodiments of the invention, it is to be understood that numerous modifications could be made without departing from the scope of this invention as claimed.

What is claimed is:
1. In a semiconductor transducer arrangement, the combination comprising:
   a semiconductor element having at least one p-n junction;
   an actuating element; and
   structural means operative to maintain said actuating element and said semiconductor element normally in a spaced-apart relation, said structural means including support means supporting one of said elements and operative in response to an applied control to bring said actuating element into contact with said semiconductor element and to apply a biasing force of controllable magnitude between said elements.
2. Apparatus in accordance with claim 1, wherein said support means is a piezoelectric element having two sides with electrodes on each of said sides and said applied control is a DC voltage applied across said electrodes to cause said piezoelectric element to bend.

3. Apparatus in accordance with claim 2 further including circuit means operative to apply a DC voltage of controllable magnitude across said electrodes.

4. Appratus in accordance with claim 3, wherein said circuit means includes a source of DC voltage and a voltage divider network including a variable resistance circuit connected in parallel across said electrodes.

5. Apparatus in accordance with claim 4, wherein said circuit means further includes switch means operative to disconnect said source of DC voltage from said piezoelectric element when said transducer is not in use.

6. Apparatus in accordance with claim 4, wherein said circuit means further includes a proximity circuit sensitive to the nearness of the human body, said circuit being connected between said source of DC voltage and said piezoelectric element to control the supply of DC voltage to said element.

7. In a circuit for a telephone substation which is connected over a subscriber line loop to a source of DC voltage in a central office, the combination comprising:
 a semiconductor transmitter comprising a hollow transmitter case having two open ends; a diaphragm mounted over one of said open ends; a semiconductor element having at least one p-n junction mounted on said diaphragm; a piezoelectric element having two sides with electrodes on each of said sides, said piezoelectric element being mounted over the other of said open ends; a stylus mounted on said piezoelectric element in a position opposite said semiconductor element and normally spaced-apart therefrom;
 a polarity switch connected to said line loop to provide a DC voltage of constant polarity at the output terminals of said switch; and
 circuit means connected between said polarity switch and said transmitter operative to control the application of said DC voltage to said piezoelectric element, said piezoelectric element bending in response to the application of said voltage to bring said stylus into contact with said semiconductor element and to apply a biasing force between said stylus and said semiconductor element of a magnitude proportional to the magnitude of said applied voltage.

8. Apparatus in accordance with claim 7, wherein said circuit means includes at least one hookswitch contact to disconnect said transmitter from said source of DC voltage when said substation is in an on-hook condition.

9. Apparatus in accordance with claim 7, wherein said circuit means includes a voltage divider network comprising a Zener diode and a variable resistance connected in parallel across said electrodes of said piezoelectric element to control the magnitude of the voltage across said electrodes.

10. Apparatus in accordance with claim 7, wherein said circuit means includes a proximity circuit sensitive to the human body to control the application of DC voltage to said piezoeletric element so that said voltage is applied only when the handset at said substation is in close proximity to the human body.

No references cited.

KATHLEEN H. CLAFFY, *Primary Examiner.*

ARTHUR A. McGILL, *Assistant Examiner.*

U.S. Cl. X.R.

179—100.41; 317—235